(12) United States Patent
Bower et al.

(10) Patent No.: US 6,630,772 B1
(45) Date of Patent: *Oct. 7, 2003

(54) DEVICE COMPRISING CARBON NANOTUBE FIELD EMITTER STRUCTURE AND PROCESS FOR FORMING DEVICE

(75) Inventors: Christopher Andrew Bower, Chapel Hill, NC (US); Otto Zhou, Chapel Hill, NC (US); Wei Zhu, Warren, NJ (US)

(73) Assignees: Agere Systems Inc., Berkeley Heights, NC (US); University of North Carolina, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,572

(22) Filed: Apr. 22, 1999

Related U.S. Application Data

(60) Provisional application No. 60/101,203, filed on Sep. 21, 1998.

(51) Int. Cl.[7] .............................. H01J 1/62; H01J 63/04
(52) U.S. Cl. .................. 313/311; 313/309; 313/310; 313/495; 445/50; 445/49; 445/51
(58) Field of Search .......................... 445/51, 50, 24, 445/49; 313/495, 496, 497, 306, 307, 308, 309, 310, 311

(56) References Cited

U.S. PATENT DOCUMENTS

| | | |
|---|---|---|
| 4,940,916 A | 7/1990 | Borel et al. |
| 5,129,850 A | 7/1992 | Kane et al. |
| 5,138,237 A | 8/1992 | Kane et al. |
| 5,271,890 A | 12/1993 | Shimura et al. |
| 5,283,500 A | 2/1994 | Kochanski |
| 5,560,898 A * | 10/1996 | Uchida et al. .............. 423/461 |
| 5,637,950 A * | 6/1997 | Jin et al. .................... 313/310 |
| 5,641,466 A * | 6/1997 | Ebbesen et al. ......... 423/447.2 |
| 5,681,196 A | 10/1997 | Jin et al. |

(List continued on next page.)

FOREIGN PATENT DOCUMENTS

| | | | |
|---|---|---|---|
| DE | 4405768 A1 | 2/1994 | |
| EP | 0838831 A2 | 4/1998 | ............. H01J/9/02 |
| EP | 947466 A1 * | 10/1999 | ............ C01B/31/02 |
| WO | WO9745854 | 4/1997 | ............. H01J/1/30 |
| WO | WO 9718577 A1 * | 5/1997 | ............. H01J/9/02 |
| WO | WO9811588 | 3/1998 | ............. H01J/1/02 |

OTHER PUBLICATIONS

U. Hubler et al., *Scanning Probe Microscopy of Carbon Nanotubes*, Carbon vol. 36, No. 5–6, 1998, pp. 697–700.

M. Yudasaka et al., *Specific Conditions for Ni Catalyzed Carbon Nanotube Growth By Chemical Vapor Deposition*, Applied Physics Letters, vol. 67, No. 17, Oct. 1995, pp. 2477–2479.

(List continued on next page.)

Primary Examiner—Nimeshkumar D. Patel
Assistant Examiner—Mariceli Santiago
(74) Attorney, Agent, or Firm—Harness, Dickey & Pierce, P.L.C.

(57) ABSTRACT

The invention provides improved devices containing adherent carbon nanotube films, in particular electron field emitter structures containing such films. Previously, attaining even moderate adherence of powdery or mat-like nanotubes to a substrate was difficult, because of the perfect fullerene structure of nanotubes, which tend to exhibit no dangling bonds or defect sites where chemical bonding to the substrate is able to occur. The invention overcomes these problems, and provides a strongly adherent nanotube film, by a variety of fabrication processes.

17 Claims, 5 Drawing Sheets

U.S. PATENT DOCUMENTS

| | | | |
|---|---|---|---|
| 5,686,182 A | | 11/1997 | Maniar |
| 5,697,827 A | | 12/1997 | Rabinowitz |
| 5,698,175 A | * | 12/1997 | Hiura et al. ............. 423/447.1 |
| 5,698,934 A | | 12/1997 | Jin et al. |
| 5,709,577 A | * | 1/1998 | Jin et al. ..................... 313/310 |
| 5,773,921 A | | 6/1998 | Keesmann et al. ......... 313/309 |
| 5,872,422 A | | 2/1999 | Xu et al. ..................... 313/311 |
| 5,908,585 A | * | 6/1999 | Shibuta ....................... 252/506 |
| 5,948,465 A | * | 9/1999 | Blanchet-Fincher et al. .. 445/50 |
| 5,977,697 A | * | 11/1999 | Jin et al. ..................... 313/310 |
| 6,019,656 A | * | 2/2000 | Park et al. .................... 445/24 |
| 6,057,637 A | * | 5/2000 | Zettl et al. .................. 313/310 |
| 6,239,547 B1 | * | 5/2001 | Uemura et al. ............. 313/495 |
| 6,250,984 B1 | * | 6/2001 | Jin et al. ....................... 445/51 |
| 6,277,318 B1 | * | 8/2001 | Bower et al. ............... 264/235 |

OTHER PUBLICATIONS

Q. Wang et al., *A Nanotube–Based Field–Emission Flat Panel Display*, Applied Physics Letters, vol. 72, No. 22, Jun. 1998, pp. 2912–2913.

Scott, A.W., *Understanding Microwaves*, Ch. 12, John Wiley & Sons (1993).

*Semiconductor International*, p. 46 (1991).

Spindt, C.A. et al., *IEEE Transactions on Electron Devices*, vol. 38, 2355 (1991).

*Advances in Electronics and Electron Physics*, edited by Peter W. Hawkes, vol. 83, p. 75 (1992).

Costellano, J.A. *Handbook of Display Technology*, Academic Press, 254 (1992).

Rinzler, et al., "Unraveling Nanotubes: Field Emission from an Atomic Wire", *Science*, vol. 269, 1550 (1995).

DeHeer et al., "A Carbon Nanotube Field–Emission Electron Source", *Science*, vol. 270, 1179 (1995).

Saito, et al., "Cathode Ray Tube Lighting Elements with Carbon Nanotube Field emitters", *Jpn. J. Appl. Phys.*, vol. 37, L346 (1998).

Wang, Q. H. et al., "Field emission from nanotube bundle emitters at low fields", *Appl. Phys, Lett.* 70 (24), pp. 3308–3310 (1997). (6/97).

Yakobson, B.I. et al., "Fullerene Nanotubes: $C_{1,000,000}$ and Beyond" *American Scientist*, vol. 85 p. 324 (1997).

Bonard, J.–M. et al., "Field emission from single–wall carbon nanotube films", *Appl. Phys. Lett.*, vol. 73, No. 7, pp. 918–920 (1998).

Bonard, J–M. et al., "Field–Emission–Induced Luminescence from Carbon Nanotubes", *Physical Review Lett.*, vol. 81, No. 7, pp. 1441–1444 (1998).

Collins, P.G. et al., "Unique characteristics of cold cathode carbon–nanotube–matrix field emitters" *Physical Review B*, vol. 55, No. 15, p. 9391 (1997).

Collins, P.G. et al., "A simple and robust electron beam source from carbon nanotubes", *Appl. Phys, Lett*. No. 69 (13) pp. 1969–1971 (1996).

Saito, Y. et al. "Field Emission Patterns from Single–Walled Carbon Nanotubes", *Jpn. J. Appl. Phys.* vol. 36 (1997).

*Semiconductor International*, p. 44 (1998).

Li, W.Z. et al., "Large–Scale Synthesis of Aligned Carbon Nanotubes", *Science*, vol. 274, pp. 1701–1703 (1996).

Ren, Z.F. et al. "Synthesis of Large Arrays of Well–Aligned Carbon Nanotubes on Glass," *Science*, vol. 282, pp. 1105–1107 (1998).

De Heer, W.A. et al., "Aligned Carbon Nanotube Films: Production and Optical and Electronic Properties", *Science*, vol. 268, pp. 845–847 (1995).

Dahn, J.R. et al., "Mechanisms for Lithium Insertion in Carbonaceous Materials", *Science*, vol. 270, pp. 590–593 (1995).

Sato, K. et al., "A Mechanism of Lithium Storage in Disordered Carbons", *Science*, vol. 264, pp. 556–558 (1994).

Dillon, A.C. et al., "Storage of hydrogen in single–walled carbon nanotubes", *Nature*, vol. 386, pp. 377–379 (1997).

Ajayan, P.M. et al., "Opening carbon nanotubes with oxygen and implications for filling", *Nature*, vol. 362, pp. 522–525 (1993).

U.S. patent application Ser. No. 09/236966, filed on Jan. 25, 1999.

U.S. patent application Ser. No. 09/236933, filed on Jan. 25, 1999.

* cited by examiner

AZIMUTH (DEGREES)

AZIMUTH (DEGREES)

DEVICE COMPRISING CARBON NANOTUBE FIELD EMITTER STRUCTURE AND PROCESS FOR FORMING DEVICE

CROSS-REFERENCE TO RELATED APPLICATION

This application claims priority of Provisional Application Ser. No. 60/101,203, which was filed Sep. 21, 1998.

BACKGROUND OF THE INVENTION

1. Field of the Invention

The invention relates to field emission devices comprising carbon nanotubes.

2. Discussion of the Related Art

Currently-used vacuum microelectronic devices include flat panel displays, klystrons and traveling wave tubes used in microwave power amplifiers, ion guns, electron beam lithography, high energy accelerators, free electron lasers, and electron microscopes and microprobes. A desirable source of electrons in such devices is field emission of the electrons into vacuum from suitable cathode materials. A typical field emission device comprises a cathode including a plurality of field emitter tips and an anode spaced from the cathode. A voltage applied between the anode and cathode induces the emission of electrons towards the anode.

One promising application for field emitters is thin matrix-addressed flat panel displays. See, for example, *Semiconductor International*, December 1991, 46; C. A. Spindt et al., "Field Emitter Arrays for Vacuum Microelectronics," *IEEE Transactions on Electron Devices*, Vol. 38, 2355 (1991); I. Brodie and C. A. Spindt, *Advances in Electronics and Electron Physics*, edited by P. W. Hawkes, Vol. 83 (1992); and J. A. Costellano, *Handbook of Display Technology*, Academic Press, 254 (1992). A conventional field emission flat panel display comprises a flat vacuum cell, the vacuum cell having a matrix array of microscopic field emitters formed on a cathode and a phosphor coated anode on a transparent front plate. Between cathode and anode is a conductive element called a grid or gate. The cathodes and gates are typically intersecting strips (usually perpendicular strips) whose intersections define pixels for the display. A given pixel is activated by applying voltage between the cathode conductor strip and the gate conductor. A more positive voltage is applied to the anode in order to impart a relatively high energy (e.g., 400 to 5000 eV) to the emitted electrons. See, for example, U.S. Pat. Nos. 4,940,916; 5,129,850; 5,138,237 and 5,283,500, the disclosures of which are hereby incorporated by reference.

Field emission is also used in microwave vacuum tube devices, such as power amplifiers, which are important components of modern microwave systems, including telecommunications, radar, electronic warfare, and navigation systems. See, e.g., A. W. Scott, *Understanding Microwaves*, John Wiley & Sons, 1993, Ch. 12. Semiconductor microwave amplifiers are also available, but microwave tube amplifiers are capable of providing microwave energy several orders of magnitude higher than such semiconductor amplifiers. The higher power is due to the fact that electrons are able to travel much faster in a vacuum than in a semiconductor material. The higher speed permits use of larger structures without unacceptable increase in transit time, and the larger structures provide greater power.

A variety of characteristics are known to be advantageous for cathode materials of field emission devices. The emission current is advantageously voltage controllable, with driver voltages in a range obtainable from commercially available integrated circuits. For typical device dimensions (e.g., 1 $\mu$m gate-to-cathode spacing in a display), a cathode that emits at fields of 25 V/$\mu$m or less is generally desirable for typical CMOS driver circuitry. The emitting current density is desirably in the range of 1–10 mA/cm$^2$ for flat panel display applications and >100 mA/cm$^2$ for microwave power amplifier applications. The emission characteristics are desirably reproducible from one source to another and desirably stable over a very long period of time (e.g., tens of thousands of hours). The emission fluctuations (noise) are desirably small enough to avoid limiting device performance. The cathode is desirably resistant to unwanted occurrences in the vacuum environment, such as ion bombardment, chemical reaction with residual gases, temperature extremes, and arcing. Finally, the cathode manufacturing is desirably inexpensive, e.g. having no highly critical processes and being adaptable to a wide variety of applications.

Conventional cathode materials for field emission devices are typically made of metal (such as Mo) or semiconductor material (such as Si) with sharp, nanometer-sized tips. While useful emission characteristics have been demonstrated for these materials, the control voltage required for emission is relatively high (around 100 V) because of their high work functions. The high voltage operation increases the damaging instabilities caused by ion bombardment and surface diffusion on the emitter tips and necessitates high power densities to be supplied from an external source to produce the required emission current density. In addition, the fabrication of uniform sharp tips is often difficult, tedious and expensive, especially over a large area. The vulnerability of these materials in a real device operating environment to phenomena such as ion bombardment, reaction with chemically active species, and temperature extremes is also a concern.

For microwave tube devices, the conventional source of electrons is a thermionic emission cathode, typically formed from Ir-Re-Os alloys or oxides such as BaO/CaO/SrO or BaO/CaO/Al$_2$O$_3$, which are coated or impregnated with metals, e.g., tungsten. These cathodes are heated to above 1000° C. to produce sufficient thermionic electron emissions (on the order of amperes per square centimeter). However, the need to heat these thermionic cathodes has the potential to create problems. Heating tends to reduce cathode life, e.g., by evaporating barium from the cathode surface. Some traveling wave tubes, for example, have lifetimes of less than a year. Heating also introduces warm-up delays, e.g., up to about 4 minutes before emission occurs, and such delays are commercially undesirable. Also, the high temperature operation requires bulky, ancillary equipment, e.g., cooling systems.

Attempts to provide improved emitter materials have recently shown carbon materials to be potentially useful as electron field emitters. Diamond emitters and related emission devices are disclosed, for example, in U.S. Pat. Nos. 5,129,850, 5,138,237, 5,616,368, 5,623,180, 5,637,950 and 5,648,699 and in Okano et al., *Appl. Phys. Lett.*, Vol. 64, 1994, 2742; Kumar et al., *Solid State Technol.*, Vol. 38, 1995, 71; and Geis et al., *J. Vac. Sci. Technol.*, Vol. B14, 1996, 2060. While diamond offers advantages as field emitters due to its negative or low electron affinity on its hydrogen-terminated surfaces, further improvements are desired.

Another, recently discovered carbon material is carbon nanotubes. See, e.g., S. Iijima, "Helical microtubules of graphitic carbon," *Nature* Vol. 354, 56 (1991); T. Ebbesen and P. Ajayan, "Large scale synthesis of carbon nanotubes," *Nature,* Vol. 358, 220 (1992); S. Iijima, "Carbon nanotubes," *MRS Bulletin,* 43 (November 1994); B. Yakobson and R. Smalley, "Fullerene Nanotubes: $C_{1,000,000}$ and Beyond," *American Scientists,* Vol. 85, 324 (1997), the disclosures of which are hereby incorporated by reference. Nanotubes take essentially two forms, single-walled (having tubular diameters of about 0.5 to about 10 nm), and multi-walled (having tubular diameters of about 10 to about 100 nm). The use of such nanotubes as electron field emitters is disclosed, for example, in German Patent No. 4,405,768; Rinzler et al., *Science,* Vol. 269, 1550 (1995); De Heer et al., *Science,* Vol. 270, 1179 (1995); De Heer et al., *Science,* Vol. 268, 845 (1995); Saito et al., *Jpn. J. Appl. Phys.,* Vol. 37, L346 (1998); Wang et al., *Appl. Phys. Lett.,* Vol. 70, 3308 (1997); Saito et al., *Jpn. J. Appl. Phys.,* Vol. 36, L1340 (1997); and Wang et al., *Appl. Phys. Lett.,* Vol. 72, 2912 (1998), the disclosures of which are hereby incorporated by reference. Carbon nanotubes feature high aspect ratio (>1,000) and small tip radii of curvature (~10 nm). These geometric characteristics, coupled with the relatively high mechanical strength and chemical stability of the tubules, indicate the potential usefulness of carbon nanotubes as electron field emitters. However, carbon nanotubes are generally available only in forms such as loose powders or porous mats, both of which are difficult to incorporate into a device structure. In addition, while previous work has discussed aligning nanotubes in an attempt to improve properties, the alignment has only been performed by techniques which do not appear to be commercially feasible (see, e.g., De Heer et al., *Science,* Vol. 268, 845 (1995)).

Thus, vacuum microelectronic devices based on improved electron field emitting material are desired. In particular, devices containing carbon nanotube emitters are desired, where the nanotubes are capable of being incorporated into such devices more easily than in current techniques.

SUMMARY OF THE INVENTION

The invention provides improved field emission devices containing carbon nanotube electron field emitter structures. According to the invention, adherent carbon nanotube films (containing single-walled and/or multi-walled nanotubes) are disposed on relatively flat conductive substrates. (Adherent film indicates a continuous film having a thickness of 0.1 to 100 μm and having an adhesion strength of at least 1.0 kpsi, as measured by a conventional stud pull test using 0.141 inch diameter studs. Nanotube film refers to a film containing at least 50 volume percent nanotubes.) Previously, attaining even moderate adherence of powdery or mat-like nanotubes to a substrate was difficult, because of the perfect fullerene structure of nanotubes, which tend to exhibit no dangling bonds or defect sites where chemical bonding is able to occur. The invention overcomes these problems, and provides a strongly adherent nanotube film. In addition, it is possible for a portion, e.g., at least 50 vol. %, of the nanotubes in the film to be aligned in substantially the same direction, with their long axes oriented perpendicular to the substrate surface, in order to enhance their emission properties. (Aligned in substantially the same direction indicates that an x-ray rocking curve will exhibit a full-width-at-half-maximum of less than 90°, for the peak representing inter-shell spacing for multi-walled nanotubes, or for the peak representing inter-tube spacing within a bundle for single-walled nanotubes.)

In one embodiment of the invention, single-walled carbon nanotubes are deposited on substrates that contain a material reactive with carbon, such as carbon dissolving elements (e.g., Ni, Fe, Co) or carbide forming elements (e.g., Si, Mo, Ti, Ta, Cr). When depositing the nanotube film onto such a substrate, it is advantageous to adjust the nanotube formation process such that a high concentration of amorphous carbon (a-C), relative to nanotubes, is initially produced and reacts with the substrate. The process is gradually adjusted to increase the nanotube production, such that the nanotubes are formed with interspersed a-C at the substrate/film interface that anchors the nanotubes to the substrate.

It is also possible to mix pre-formed nanotubes with solvent to form a slurry and then deposit the slurry, e.g., by spin-on, spray, or printing techniques, onto a substrate having a surface layer containing carbon-dissolving or carbide forming materials. It is also possible to use a substrate having a low melting point material, i.e., less than 700° C., such as aluminum. Subsequent heating induces either reaction of nanotubes with the carbon-dissolving or carbide forming materials or melting of the surface layer, such that the nanotubes are anchored to the substrate. It is also possible to form an adherent nanotube film by techniques such as mixing pre-formed nanotubes with solvent and binder, and optionally solder, and depositing the mixture onto a substrate. Subsequent heating will activate the binder and/or melt the solder to anchor the nanotubes to the substrate.

In the above embodiments, it is possible to simultaneously align the nanotubes in substantially the same direction by depositing them in a magnetic or electric field, such that the anisotropic nanotubes align their long axes with the field lines during deposition. It is believed that alignment of the nanotubes provides improved emission properties due to more efficient and effective field concentration at the aligned tubule ends. Alignment of pre-formed nanotubes is also capable of being achieved by mixing nanotubes with a conductive polymer to form a composite material, and then straining the composite with a uniaxial load. (A conductive polymer exhibits an electrical resistivity less than 1 ohm-cm.) It is then possible to adhere the composite to a substrate.

The invention thereby provides a device containing an improved carbon nanotube film emitter structure, due to the nanotube film's strong adherence to a substrate and optional alignment in a substantially uniform manner. Such nanotube emitters show desirable emission properties, e.g., low threshold voltage (about 3–4 V/μm or less at a current density of 10 mA/cm$^2$), high current densities (greater than 0.2 A/cm$^2$) and excellent reproducibility and durability. In addition, the emission characteristics appear to remain essentially the same even after the emitting surface is exposed to air for several months.

DETAILED DESCRIPTION OF THE INVENTION

Figure 1:
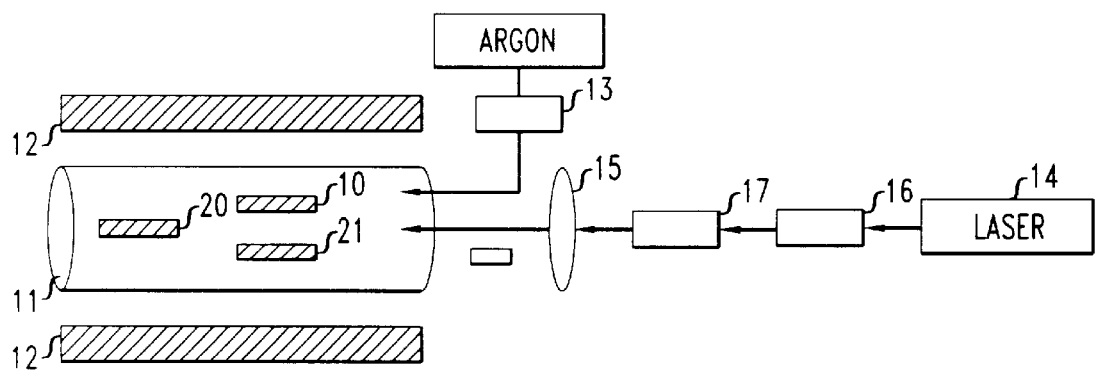
FIG. 1 is a schematic diagram of a laser ablation apparatus useful for forming nanotubes.

The invention provides devices containing adherent carbon nanotube films (containing single-walled and/or multi-walled nanotubes). Such films are particularly useful in field emitter structures.

In one embodiment, a field emitter structure is formed as follows. A substrate having a relatively flat surface is provided. The substrate is typically a metal, a semiconductor or a conductive oxide (conductive indicating a resistivity less than $10^3$ ohm-cm). It is also possible for the substrate to be insulating if a conductive layer is applied to the surface. The carbon nanotubes are fabricated as an adherent film structure on a substrate surface. Currently, carbon nanotubes are typically able to be prepared as either powders or porous mats. Neither powders nor porous mats lend themselves to convenient preparation of a robust, adherent cathode structure in a device. The difficulty in fabricating adherent films of carbon nanotubes generally is due to the fact that the carbon atoms in nanotubes are arranged in a perfect fullerene structure, which have no dangling bonds or defect sites where chemical bonding to a substrate surface occurs. As a result, nanotubes tend to exhibit poor adhesion to a variety of substrates. Specifically, deposited nanotubes tend to delaminate, without any outside force, after deposition, and are also easily blown or scraped off a substrate surface during manipulation of the substrate.

An adherent, carbon nanotube film is formed either during formation of the nanotubes (referred to herein as in situ) or by treatment of pre-formed nanotubes (referred to herein as ex situ). For either method, it is possible to produce the carbon nanotubes themselves by a number of techniques, including carbon-arc discharges, chemical vapor deposition via catalytic pyrolysis of hydrocarbons, laser ablation of catalytic metal-containing graphite target and condensed-phase electrolysis. (See, e.g., S. Iijima, "Carbon nanotubes," *MRS Bulletin*, 43 (November 1994); and B. Yakobson and R. Smalley, "Fullerene Nanotubes: $C_{1,000,000}$ and Beyond," *American Scientists*, Vol. 85, 324 (1997), referenced above.) Depending on the method of preparation and the specific process parameters, which largely control the degree of graphitization and the helicity and the diameter of the tubes, the nanotubes are capable of being produced primarily as multi-walled tubes, single-walled tubes, or bundles of single-walled tubes. Similarly, the tubes are capable of adopting various shapes, such as straight, curved, chiral, achiral, and helix. Typically, the nanotubes are formed along with some amorphous carbon and catalyst particles intermixed therein, e.g., about 20 to 40 vol. %, although it is possible to remove the amorphous carbon and catalyst particles by etching in an oxygen plasma, which is selective to the amorphous carbon over the nanotubes, by heating at temperatures greater than 600° C. in air or under partial oxygen pressure (see T. W. Ebbesen, *Annual Rev. Mater. Sci.*, Vol. 24, 235–264 (1994)), by etching in acid, or by filtration (see K. B. Shelimov et al., *Chem Phys. Lett.*, Vol. 282, 429 (1998)).

FIG. 1 schematically shows an apparatus useful for depositing adherent thin film nanotubes by a laser ablation technique. In one embodiment of the invention, the apparatus is used as follows (variations of this laser ablation embodiment are possible). A target 10 is formed by mixing graphite powder with metal catalysts and graphite cement, as known in the art. The resulting mixture is pressed to a pellet by conventional methods and cured, e.g., by heating under pressure at 100 to 150° C. for several hours and then at 800° C. for 10 hours in flowing Argon. The resulting target 10 is placed in the center of a quartz tube 11 (e.g., having an outer diameter of 1.5 inches) that is located within a furnace 12, the tube being flushed by a constant flow of argon (e.g., at about 80 torr). The argon flow rate is typically controlled by a flow meter 13, and generally falls within the range of 10 to 50 SCCM. The furnace is gradually heated to a temperature of about 1150° C. A Nd:YAG pulsed laser 14 having an energy density of 30 to 70 $mJ/mm^2$ is typically used to ablate the target 10. The laser beam is generally focused to about 1 to about 5 mm in diameter by us of a focusing lens 15, and is scanned across the target 10 surface by horizontal 16 and vertical 17 optical scanners. It is possible to place a camera 18, e.g., a CCD camera, in front of the quartz tube 11 to monitor the ablation process. A substrate 20, formed from a material as discussed herein, is located in the quartz tube 11, downstream of the target 10. When the target 10 is ablated by the laser 14, a film of carbon nanotubes is deposited onto the substrate 20. As discussed below, if deposition of amorphous carbon is desired to improve adhesion of the nanotubes, it is possible to include a second target 21 formed primarily from graphite, which will yield the amorphous carbon. The extent of ablation of the first target 10 vs. the second target 21 will control the ratio of nanotubes and amorphous carbon deposited onto the substrate.

Figure 2:
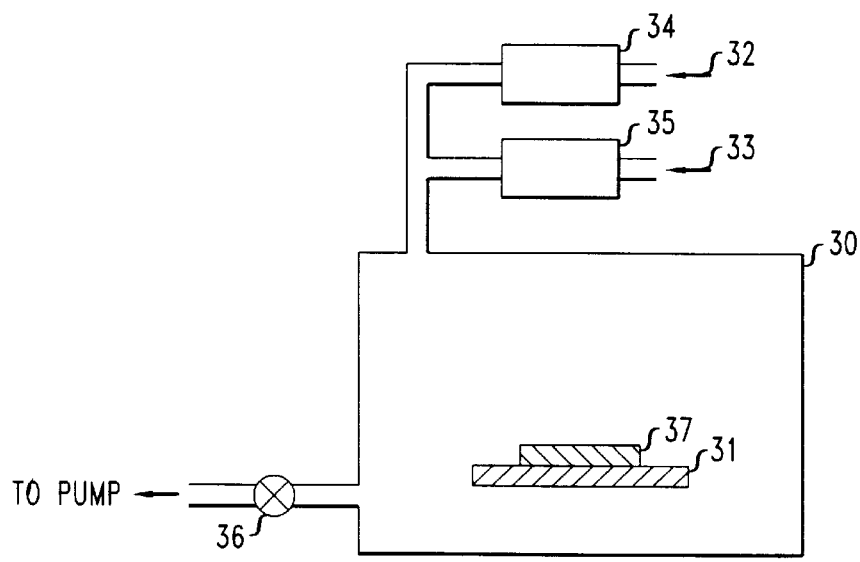
FIG. 2 is a schematic diagram of a chemical vapor deposition apparatus useful for forming nanotubes.

FIG. 2 shows an apparatus useful for forming nanotube films by chemical vapor deposition. The apparatus contains a heater 31 located inside a vacuum chamber 30. A reactive carbon-containing gas 32, such as $CH_4$, $C_2H_2$, CO, or $CO_2$, is directed into the chamber 30 along with an inert or carrier gas 33, such as argon, hydrogen, or nitrogen. Flow rates are controlled by mass flow meters 34, 35. The chamber 30 pressure is controlled by a pressure valve 36 installed in the pumping path. During deposition, a substrate 37 is placed on top of the heater 31 and is heated to a temperature typically ranging from 400 to 1200° C. Carbon concentration in the gas phase is typically 5 to 30 at. %, and the chamber pressure is typically 10 to 200 torr. To nucleate carbon nanotubes, the substrate is pre-coated with catalytic metals such as nickel, cobalt, ferrite, or alloys thereof. Catalysts are also able to be provided through the gas phase by use of ferrocene or ferric acid (see R. Sen et al., *Chem. Phys. Lett.*, Vol. 267, 276 (1997), and L. C. Qin, *Appl. Phys. Lett.*, Vol. 72, No. 26, 3437 (1998)). Where deposition of amorphous carbon is desired, as in some of the embodiments of the invention, it is possible to adjust the growth conditions to attain such amorphous carbon, e.g., by lowering substrate temperatures to under 600° C. and/or raising carbon concentrations in the gas phase above 50 at. %.

For in situ formation of an adherent nanotube film, the substrate material selected is generally reactive with carbon. Carbon-reactive materials include carbon-dissolving elements and carbide-forming elements. Carbon-dissolving materials are known in the art, as reflected for example in T. B. Massalski, *Binary Alloy Phase Diagrams*, Vol. I, ASM International, and include elements such as Ni, Fe, Co, and Mn. Carbide-forming materials are similarly known, as reflected in T. B. Massalski, supra, and include elements such as Si, Mo, Ti, Ta, W, Nb, Zr, V, Cr, and Hf. If a substrate is not carbon-reactive, it is possible to deposit a layer of a carbon-reactive material onto the substrate. Typically, to facilitate adhesion of the carbon nanotubes to such substrates, an initial layer of a-C is deposited on the substrate. As mentioned above, a typical nanotube fabrication process produces at least 20 vol.% a-C, which intermixes with the nanotubes. It is possible to adjust the parameters of the process, such as by lowering the growth temperature, reducing the concentration of catalytic metals, adding an additional graphite target (in a laser ablation method), or increasing the carbon concentration in the gas phase (for chemical vapor deposition), to produce a greater concentration of a-C. To form the adherent layer, the process is adjusted to initially produce, for example, greater than 50 vol. % a-C. Since a-C does not exhibit the perfect atomic structure of nanotubes, a-C more easily adheres to a variety of substrates, e.g., through dissolution or carbide formation in the above-mentioned substrates when deposited at relatively high temperatures above about 500° C. Once a thin a-C layer, e.g., less than 100 Å, is deposited, the formation process is gradually adjusted to increase the percentage of nanotubes being generated. The resulting film contains a-C and nanotubes, with the interfacial and intermixed a-C anchoring the nanotubes. The combined a-C/nanotube film generally has an overall thickness of about 0.1 to about 100 μm.

Thus, nanotubes are able to be deposited directly onto a substrate (mixed with amorphous carbon) as an adherent film. (Adherent, as discussed above, indicates that the nanotube film exhibits an adhesion strength of at least 1.0 kpsi, advantageously at least 1.5 kpsi, as measured by a stud pull test using 0.141 diameter studs.)

When using such in situ techniques, it is also possible to add a small amount of a carbon-reactive gaseous species into a nanotube-forming vapor deposition process to achieve better adhesion. For example, in a formation process using an acetylene gas (for thermal pyrolytic deposition of nanotubes) and a non-carbon reactive substrate, e.g., oxides, it is possible to add a small amount of silane into the reaction chamber during the initial stages of the reaction. The generated carbon reacts with the gaseous Si species to form silicon carbide on the substrate. The carbide typically adheres well to most oxide substrate materials and the generated a-C and nanotubes more easily adhere to the forming silicon carbide.

Adherent nanotube thin films are also capable of being fabricated ex situ from pre-formed nanotubes. The nanotubes are formed by any known method such as discussed above. With such an ex situ technique, the nanotube-containing product is advantageously purified before the mixing to remove co-deposited a-C. Such purification is typically performed by heating in air above 600° C., by using oxygen plasma to etch the a-C components of the nanotube film, by acid etching, or by filtering the deposit.

In one ex situ embodiment, it is possible to mix nanotube powder with a solvent, such as methanol, in an ultrasonic bath. The suspension or slurry is then disposed onto a substrate by techniques such as spinning or spraying. The substrate is typically pre-coated with carbon-reactive or carbide-forming elements, such as those discussed herein. It is also possible to coat the substrate with a low melting point (<700° C.) material such as aluminum. Subsequent heating then induces a reaction between the nanotubes and carbon-reactive or carbide-forming elements, or induces melting of the low melting point material, such that the nanotubes become anchored to the substrate.

It is also possible to mix nanotube powders with solvents and binders to form a solution or slurry. Optionally, the mixture also contains conductive particles such as elemental metals or alloys (e.g. solder) to further promote adhesion. The mixture is then screen printed or dispersed, e.g., by spray or spin-on methods or electrophoresis, onto a substrate to form a desired emitter structure. Annealing in either air, vacuum or inert atmosphere, e.g., at temperature of about 150 to about 250° C., is then typically performed to drive out the solvent and activate the binder, resulting in an adherent nanotube structure on a substrate. Where solder particles are used, particularly solders having low melting temperatures of less than 200° C., e.g., Sn, In, Sn-In, Sn-Bi or Pb-Sn, the annealing temperature is typically sufficient to melt the solder, which enhances the adhesion of the nanotubes.

Alternatively, it is possible to mix the nanotube powder with conductive polymers (such as silver-based polymers), and apply the mixture to a substrate by conventional methods such as screen printing, spray or spin-on methods, or electrophoresis, or by more simple mechanical methods, such as pressing, to form an adherent nanotube-containing film.

Optionally, in either the in situ or ex situ methods of forming the adherent nanotube film, the nanotubes are arranged in the film such that their long axes are aligned in substantially the same direction, perpendicular to the surface of the substrate, to enhance the emission properties. Conventional nanotube preparation provides nanotubes with random orientation—twisting and intersecting with each other. Although the exact emission mechanism from nanotubes is not completely understood, it is believed that by aligning the one-dimensional nanotubes in an ends-on fashion, i.e., the long axes of the tubules aligned along the direction of electron emission, the emission properties are improved due to more efficient and uniform field concentration at the tubule ends. Advantageously, the adherent films discussed above are provided with such orientation. The degree of alignment (i.e., the volume percentage of nanotubes in the film that are substantially aligned with each other) is advantageously about 50 vol. % or greater, advantageously 75 vol. % or greater.

In one in situ alignment technique, useful with the in situ method of forming an adherent nanotube film, magnetic and/or electric fields are applied during deposition of nanotubes directly onto the substrate. Because of the anisotropic nature of nanotubes, the tubules interact with the magnetic or electric field and align their long axes along the field lines in order to reduce the overall energy of the system. The field lines are generally applied perpendicular to the substrate surface to provide a desired alignment. It is expected that the degree of alignment will increase with field strength. An electric field of $10^3$ to $10^6$ V/cm and a magnetic field greater than 50 Oe are expected to be suitable.

Figure 5:
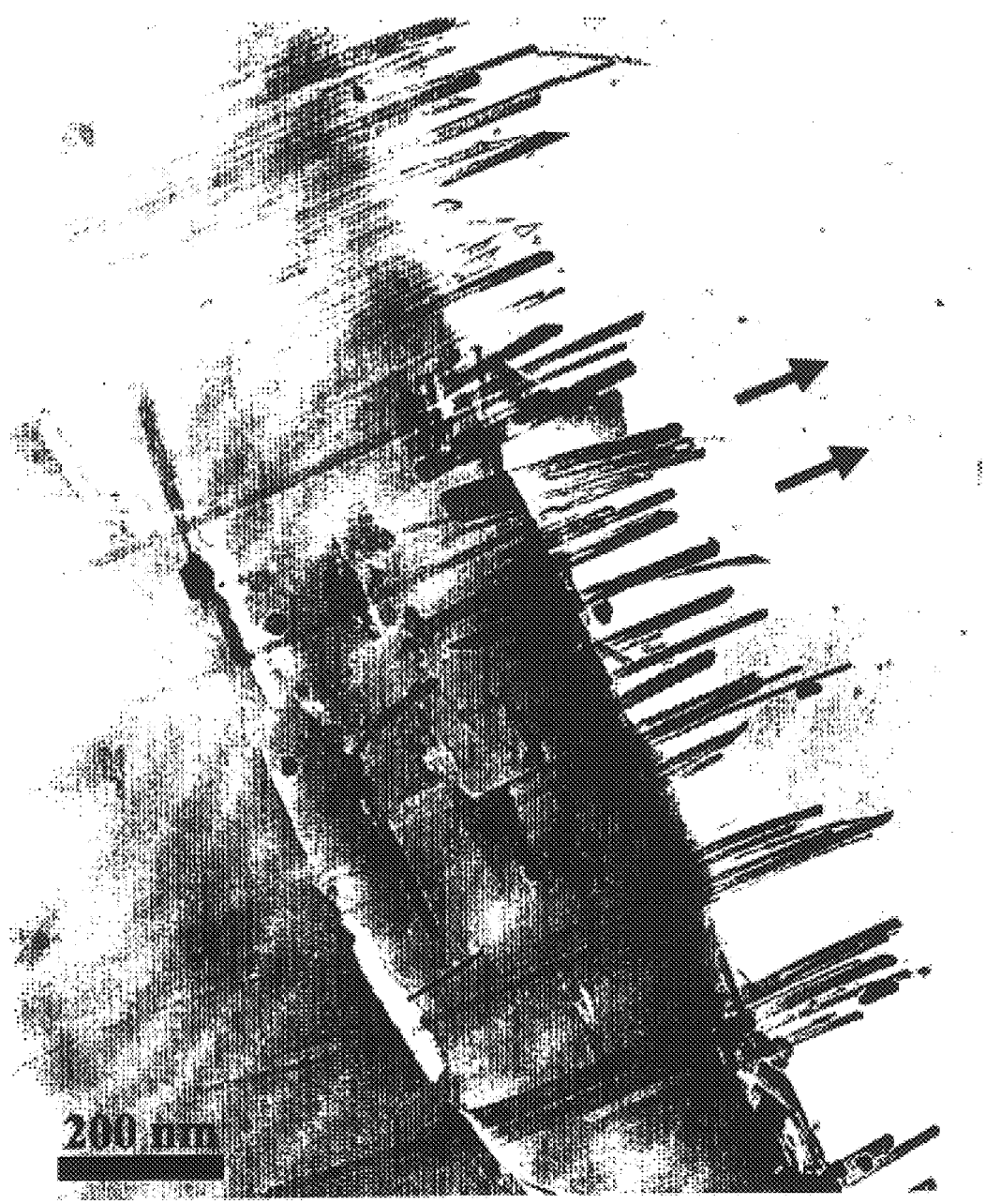
FIG. 5. is a TEM micrograph showing the aligned carbon nanotubes created by mechanically stretching a nanotube-polymer composite according to Example 1.

Ex situ alignment of pre-formed nanotubes generally involves the preparation of a nanotube-polymer composite (e.g., using conductive polymers as discussed above) by casting, molding or other techniques. It is then possible to align the nanotubes that are located within the polymer matrix. One way to do so is to subject the composites to uniaxial load above the softening temperature of the matrix, which aligns the nanotubes in the direction of the load. (Softening temperature indicates the temperature at which the onset of extensive molecular motion occurs, i.e., below which the polymer is glassy, and above which the polymer is rubbery. Typically, the softening temperature is the glass transition temperature.) Once the desired level of alignment is attained, the load is released, below the softening temperature, to maintain the structure of the nanotubes. By controlling the draw ratio of the composite material, the degree of alignment is capable of being adjusted. It is also possible to induce alignment of nanotubes in such a composite material by shear, e.g., using a roll-casting method, in which case the composite mixture is processed between two eccentric co-rotating cylinders. In such a case the nanotubes are aligned with their long axes in the direction of the shear. FIG. 5 is a transmission electron microscope (TEM) micrograph according to Example 2, showing a nanotube/polymer composite after mechanical alignment, i.e., application of a uniaxial load to the composite sheet, in which the majority of the nanotubes are aligned parallel to the stress direction.

It is then possible to apply the oriented composite sheet onto a substrate as an adherent film by a variety of methods, including use of binders, adhesives, or solders, or by simple mechanical pressing (depending on the substrate and the polymer material of the composite).

After formation of the adherent nanotube film, an electrode is formed adjacent to the film to excite emission. Optionally, this electrode is a high density aperture gate structure such as described in U.S. Pat. No. 5,698,934. It is possible to achieve such a high density gate aperture structure by utilizing micron or submicron sized particle masks. After the adherent nanotube film is deposited on the substrate, mask particles (metal, ceramic or plastic particles typically having maximum dimensions less than 5 $\mu$m) are applied to the film surface, e.g., by spraying or sprinkling. A dielectric layer such as $SiO_2$ is deposited over the mask particles as by evaporation or sputtering, followed by deposition of a gate metal film. Because of the shadow effect, the emitter areas underneath each mask particle have no dielectric or metal film. The mask particles are then easily brushed or blown away, leaving a gate electrode having a high density of apertures.

For display applications, emitter material (the cold cathode) in each pixel of the display desirably consists of multiple emitters for the purpose, among others, of averaging out the emission characteristics and ensuring uniformity in display quality. Because of the nanoscopic nature of the carbon nanotubes, the emitter provides many emitting points, typically more than $10^5$ emitting tips per pixel of $100 \times 100\,\mu m^2$, assuming 50% nanotube density with a tubule diameter of 100 nm. Advantageously, the emitter density in the invention is at least $10/\mu m^2$, more advantageously at least $100/\mu m^2$. Since efficient electron emission at low applied voltage is typically achieved by the presence of accelerating gate electrode in close proximity (typically about 1 micron distance), it is useful to have multiple gate aperture over a given emitter area to maximally utilize the capability of multiple emitters. It is also desirable to have fine-scale, micron-sized structure with as many gate apertures as possible for maximum emission efficiency.

Figure 3:
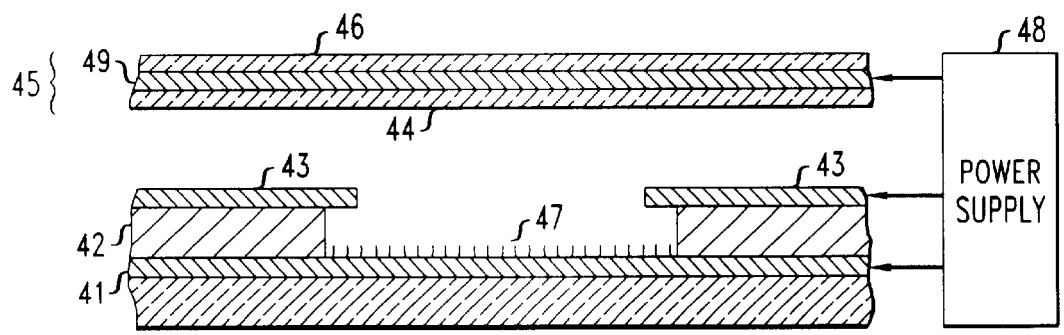
FIG. 3 is a schematic diagram of a field emission display device.

A significant use of the low voltage emitters of the invention is in the fabrication of field emission devices such as field emission flat panel displays. FIG. 3 is a schematic cross section of a flat panel display using thin film nanotube field emitters. The display comprises a cathode 41 including a plurality of nanotube emitters 47 and an anode 45 disposed in spaced relation from the emitters within a vacuum seal. The anode conductor 49 formed on a transparent insulating substrate 46 is provided with a phosphor layer 44 and mounted on support pillars (not shown). Between the cathode and the anode and closely spaced from the emitters is a perforated conductive gate layer 43. Conveniently, the gate 43 is spaced from the cathode 41 by a thin insulating layer 42.

The space between the anode and the emitter is sealed and evacuated, and voltage is applied by power supply 48. The field-emitted electrons from nanotube emitters 47 are accelerated by the gate electrode 43 from multiple emitters 47 in each pixel and move toward the anode conductive layer 49 (typically a transparent conductor such as indium-tin-oxide) coated on the anode substrate 46. A phosphor layer 44 is disposed between the electron emitters and the anode. As the accelerated electrons hit the phosphor layer 44, a display image is generated.

Figure 4A:
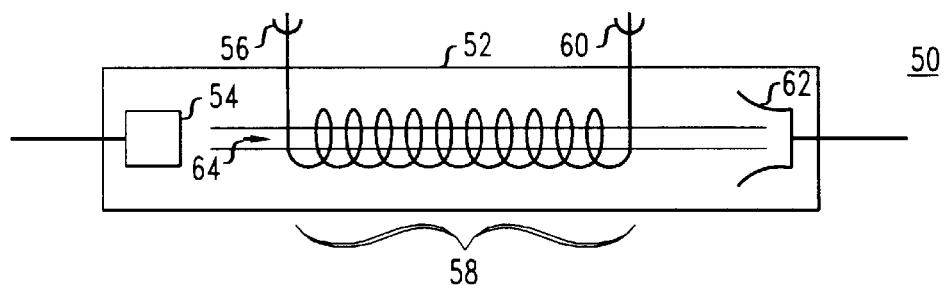
FIGS. 4A and 4B are schematic diagrams of a traveling wave tube microwave emitter device.
Figure 4B:
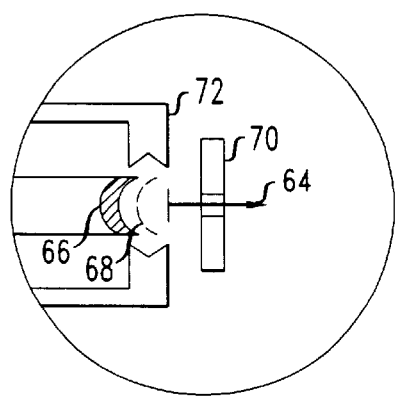

The nanotube emitter structures are also useful in microwave vacuum devices such as a traveling wave tube (TWT). See, e.g., A. Gilmour, Jr., *Microwave Tubes,* Artech House, 1986. FIGS. 4A and 4B schematically illustrate a TWT 50. The TWT contains an evacuated tube 52, an electron source (here an electron gun 54), an input window 56 for introducing a microwave input signal, an interaction structure 58 where the electrons interact with the input signal, and a microwave output window 60 where microwave power derived from the electrons is taken out of the tube. Other components of the TWT are a focusing magnet (not shown) to focus the beam of electrons through the interaction structure 58, a collector 62 to collect the electron beam after the output microwave power has been generated, and an internal attenuator (not shown) to absorb microwave power reflected back into the tube from mismatches in the output. The interaction region 58 is typically a conductive helix for broadband applications and a coupled-cavity region for high power applications.

The electron gun 54 generates, accelerates, and focuses an electron beam to follow a desired trajectory. For TWT applications, a long, thin electron beam at relatively low voltage and high current is desirable. Electron guns range in configuration from, for example, a planar cathode faced by a planar anode to more elaborate designs such as Pierce guns, conical diode electrodes, concentric cylinders, and spherical cap cathodes. (See, e.g., A. Gilmour, Jr., *Microwave Tubes,* supra.) In operation of the TWT, an electron beam 64 is accelerated from a cathode 66 by high voltages applied to grids 68 and an anode 70, and focused by control electrodes 72. The beam 64 is directed into the interaction structure 58 where the beam 64 interacts with the microwave input signal to be amplified as the electrons and the signal travel together through the interaction structure 58. The electrons advantageously travel at the same velocity as the microwave signal on the interaction structure 58. The modulated electron beam generates an amplified form of the input signal at the output 60.

The low field nanotube emitters of the invention are also useful as cold cathodes in other field emission devices, including x-y matrix addressable electron sources, electron sources for electron beam lithography, and similar applications apparent to one skilled in the art.

The invention will be further clarified by the following examples, which are intended to be exemplary.

EXAMPLE 1

Single-walled carbon nanotubes were synthesized using a laser ablation system such as shown in FIG. 1. A target of graphite mixed with nickel/cobalt catalyst material was placed inside a furnace and heated to 1150° C. under constant Ar flow. The target was ablated by the primary beam of a pulsed Nd:YAG laser ($\lambda$=1064 nm) (a Quanta-Ray DCR-2A laser). Materials produced were in the form of a mat on a cold surface. Transmission electron microscope, scanning electron microscope, and Raman spectroscopy indicated that the raw material contained about 70 vol. % single walled nanotubes having an average diameter of 1.4 to 1.5 nm, with the remaining 30 vol. % made up of amorphous carbon and intermixed catalyst particles. The raw material was purified by ultrasonically dispersing the nanotubes in a solvent and performing multiple filtering.

Three silicon wafers were pre-coated with a thin layer of iron, chromium, and aluminum, respectively, by sputtering or thermal evaporation. The metallic layers were about 10 to 100 nm thick. (Iron is a carbon-dissolving element, chromium a carbide-forming element, and aluminum a low melting point metal.)

A air-spraying technique was used to dispose the nanotubes onto the coated substrates. Specifically, a conventional atomizer spray nozzle was attached to a high pressure gas line carrying argon at about 20 psi, and a sprayer inlet was placed into a beaker filled with nanotubes dispersed in methanol. A fine mist of solvent and nanotubes was produced. The substrates were heated to about 200° C. and located about 12 inches from the spray nozzle. This arrangement appeared to allow the solvent to evaporate fully before the nanotubes contacted the substrate surface. Smooth, as-sprayed films were produced.

The coated substrates were placed under vacuum at $10^{-6}$ torr and heated at 800° C. for three hours. This annealing process is believed to promote chemical reactions between the nanotubes and iron, or the nanotubes and chromium, or, in the case of aluminum, to allow molten aluminum to coat portions of the nanotubes such that the nanotubes are anchored upon cooling. After annealing, the films exhibited high adhesion strength in the range of 1.2 to 1.7 kpsi as measured by the stud pull test discussed herein. SEM examination further revealed that application and removal of conventional Scotch® brand-type tape did not pull the nanotubes off the substrate. And ultrasonication in methanol similarly did not remove the nanotubes from the substrate.

Electron emission measurements were performed on these adherent nanotube films in a vacuum chamber at $10^{-8}$ torr and room temperature. The experimental set-up is as described in W. Zhu et al., "Electron field emission from chemical vapor deposited diamond," *J. Vac. Sci. Technol.*, Vol. B14, 2011 (1996). Briefly, a voltage up to 2 kV was applied to a spherical tungsten probe (0.5 mm in diameter) which collects the current emitted from the grounded nanotube samples. A precision step motor was used to vary the distance between the probe and the sample surface with a step size of 3.3 μm. The current voltage (I–V) characteristics were collected as a function of anode-cathode distance, from about 6 μm to about 320 μm.

Figure 6A:
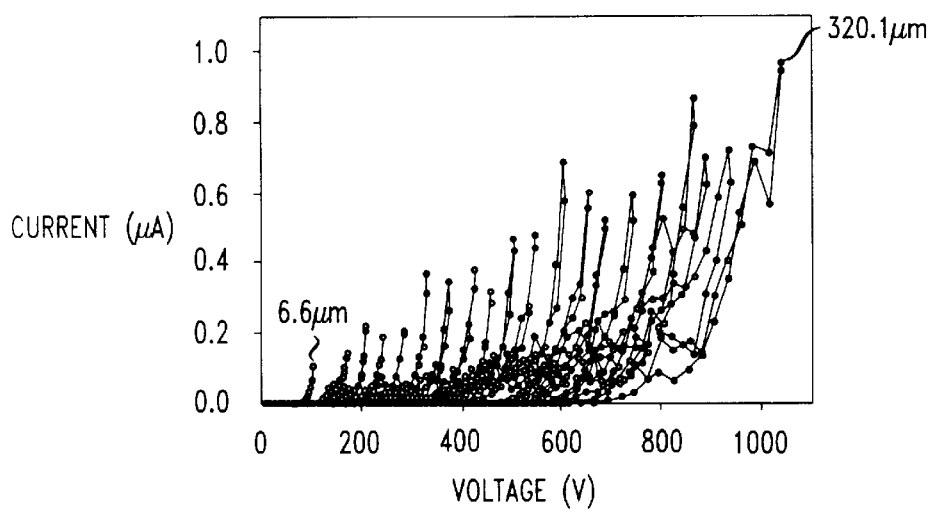
FIGS. 6A and 6B illustrate emission properties of an adherent nanotube film according to the invention.
Figure 6B:
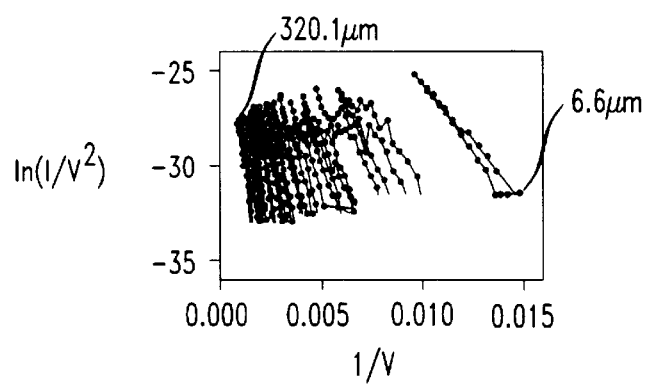

FIG. 6A shows the electron emission current vs. applied voltage for anode-cathode distances from 6.6 μm to 320.1 μm, for the iron-coated sample. It is clear that smooth and consistent I–V curves are measured in a history-independent, reproducible manner. FIG. 6B shows the same data as FIG. 6A, but is plotted as $\log(I/V^2)$ vs. $1/V$, which shows the characteristic Fowler-Nordheim linearity.

Figure 7:
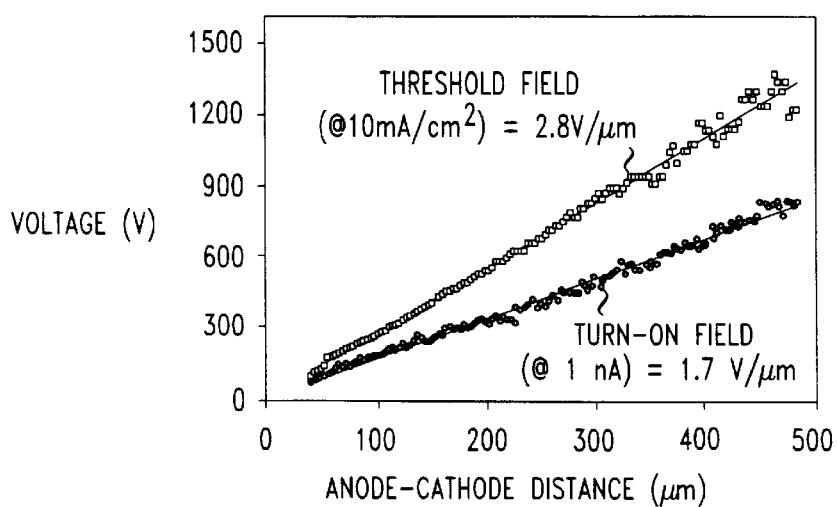
FIG. 7 illustrates emission properties of an adherent nanotube film according to the invention.

FIG. 7 shows that for the iron-coated sample, the turn-on field (i.e., the field that generates an emission current of 1 nA) is only 1.7 V/μm, and the threshold field (i.e., the field that generates an emission current density of 10 mA/cm²) is 2.8 V/μm. These values are an order of magnitude less than fields required for other types of emitters, such as molybdenum, silicon, and diamond emitters.

Similar emission properties were exhibited by the other nanotube samples.

EXAMPLE 2

Carbon nanotubes formed by a laser ablation process such as described above were ground to fine powders and soni-cated in solvent for 1 hour at room temperature. A thermoplastic polymer, polyhydroxyaminoether (PHAE) from Dow Chemical Co., with a glass transition temperature less than room temperature was dissolved into the nanotube/solvent suspension. After further sonification, the suspension was transferred into a Teflon mold and air-dried in a fume hood overnight. A black thin film formed in the Teflon mold was peeled away. Films having nanotube weight percents of up to 50% were formed in this manner, and cut into strips approximately 5 mm by 3 mm. The films were mechanically stretched by applying a constant load at temperatures of 90 to 100° C. (above the polymer's glass transition temperature), using varying loads. The films were typically stretched to 500% (final length over initial length) without fracture. After the desired stretching ratio was reached, the sample was cooled down to room temperature before releasing the load.

X-ray diffraction patterns were obtained for both stretched and nonstretched samples, using a 1.5 kW Cu source, HOPG (002) monochromator, and a two dimensional imaging plate detector (MAC Science DIP2000 with 2500×2500 pixels and 80 μm pixel resolution) in the transmission mode. Structures of multi-walled nanotubes have been previously studied. (See, e.g., O. Zhou et al., *Science*, Vol. 263, 1744 (1994). The diffraction pattern is dominated by a strong Bragg peak centered around 3.4 Å, which corresponds to the inter-shell spacing within the same nanotube (referred to as the (002) peak).

Figure 8A:
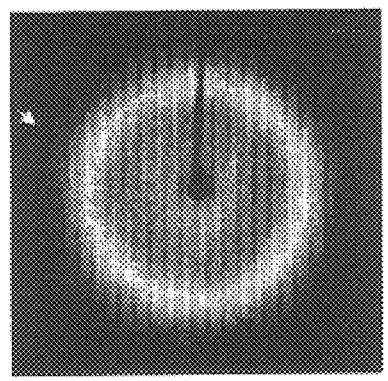
FIGS. 8A and 8B are x-ray diffraction patterns of, respectively, unstretched and stretched nanotube-polymer composite films.
Figure 8A:
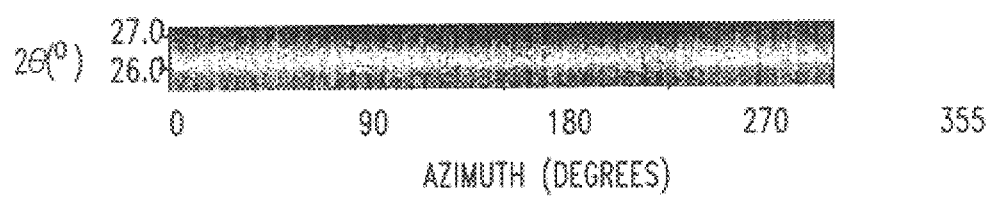

When the nanotubes are randomly oriented, a powder diffraction ring with the d-space of 3.4 Å and uniform intensity distribution is expected. If the nanotubes have a preferred orientation, the Bragg intensities will be concentrated at two spots at the intersections of the plane defined by $K_i$ (incident x-ray beam) and Q002 (reciprocal space vector). A typical 2D x-ray diffraction pattern of an as-cast film is shown in FIG. 8A. The data is plotted as 2θ versus azimuth angle φ. The Bragg peak corresponding to the nanotube inter-shell spacing, d002, was centered around 26.1° in 2θ (d=3.41 Å), and is essentially a constant with respect to φ from 0 to 360° (along the circumference of the diffraction ring).

Figure 8B:
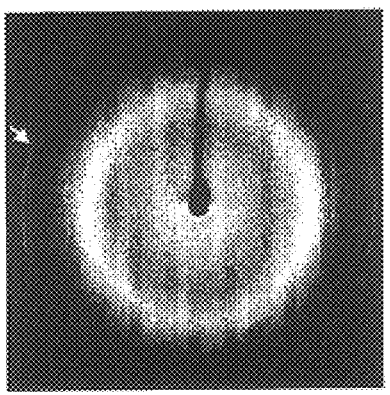
Figure 8B:
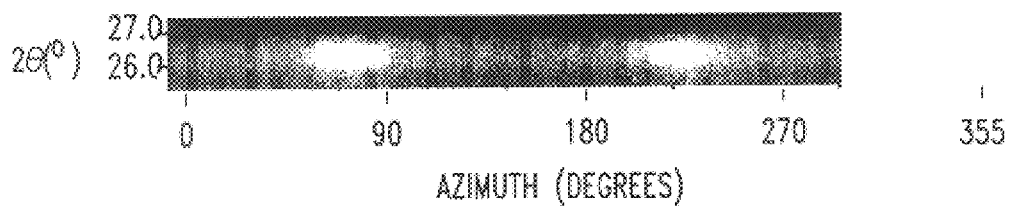

The x-ray diffraction pattern of a stretched (330%) film having about 50 wt. % nanotubes is shown in FIG. 8B. The data was taken with $K_i$ perpendicular to the film surface and stretching direction. The (002) Bragg intensity was concentrated at two spots centered at φ=90° and 270°. The change in diffraction pattern from FIG. 8A shows that the nanotubes in the stretched film are aligned with their longitudinal axes parallel to the stretching direction. By fitting and analyzing the 2D intensity data, the fraction of nanotubes aligned, and the degree of alignment are capable of being determined. In the sample of FIG. 8B, 58% of the nanotubes were substantially aligned along the stress direction, with a cone of 20° mosaic angle.

The dispersion and alignment of the nanotubes were examined by transmission electron microscopy (TEM). The composite samples were cut into approximately 90 nm thick membranes using microtomy with a diamond blade. The nanotubes and impurity nanoparticles were dispersed in the matrix without significant aggregation, and were substantially wetted by the polymer, as reflected in FIG. 5, which shows a film sample that was sliced parallel to the stretching direction (indicated by the arrows).

Other embodiments of the invention will be apparent to those skilled in the art from consideration of the specification and practice of the invention disclosed herein.

What is claimed is:

1. A process for fabricating a device, comprising the steps of:

provating a substrate, and disposing an adherent carbon nanotube film on the substrate, aligning at least 50 volume percent of the carbon nanotubes in substantially the same direction, wherein the substrate comprises at least one material selected from the group consisting of carbon-dissolving elements, carbide-forming elements, and low melting point materials.

2. The process for fabricating a device according to claim 1, wherein:

the step of aligning the carbon nanotubes further comprises applying at least one of an electric field and a magnetic field while disposing the adherent carbon nanotube film on the substrate.

3. The process for fabricating a device according to claim 2, wherein the adherent carbon nanotube film is disposed on the substrate in the absence of polymeric material.

4. The process for fabricating a device according to claim 2, the step of disposing an adherent carbon nanotube film on the substrate further comprising the steps of:
disposing carbon nanotubes on the substrate; and
heating the substrate and the carbon nanotubes to a temperature sufficient to induce at least one of:
a reaction of at least a portion of the carbon nanotubes with the carbon-dissolving elements,
a reaction of at least a portion of the carbon nanotubes with the carbide-forming elements, and
a melting of at least a portion of the low melting point materials.

5. The process for fabricating a device according to claim 2, the step of disposing an adherent carbon nanotube film on the substrate further comprising the steps of:
forming a dispersion of carbon nanotubes in a solvent;
applying the dispersion to a surface of the substrate to coat the substrate surface; and
evaporating substantially all of the solvent to form a layer of carbon nanotubes on the surface of the substrate.

6. The process for fabricating a device according to claim 5, further comprising the steps of purifying and ultrasonicating the carbon nanotubes.

7. The process for fabricating a device according to claim 5, the step of disposing an adherent carbon nanotube film on the substrate further comprising the step of:
heating the substrate to a temperature sufficient to induce at least one of
a reaction of at least a portion of the carbon nanotubes with the carbon-dissolving elements,
a reaction of at least a portion of the carbon nanotubes with the carbide-forming elements, and
a melting of at least a portion of the low melting point materials.

8. The process for fabricating a device according to claim 2, wherein at least 75 volume percent of the carbon nanotubes in the adherent carbon nanotube film are aligned in substantially the same direction.

9. The process for fabricating a device according to claim 1, wherein:

the step of aligning the carbon nanotubes further comprises the steps of
mixing carbon nanotubes with a polymer to form a composite material characterized by a softening temperature,
heating the composite material to a temperature above the softening temperature,
subjecting the composite material to a uniaxial load,
cooling the composite material to a temperature below the softening temperature, and
releasing the uniaxial load.

10. The process for fabricating a device according to claim 9, wherein at least 75 volume percent of the carbon nanotubes in the adherent carbon nanotube film are aligned in substantially the same direction.

11. A device comprising a substrate, and a carbon nanotube film formed on a surface of the substrate, the carbon nanotube film comprising at least 50 percent by volume carbon nanotubes;

wherein, at least 50 percent of the carbon nanotubes are aligned in a direction generally parallel to an alignment axis.

12. A device according to claim 11:

further wherein the alignment axis is generally perpendicular to the surface of the substrate.

13. A device according to claim 12:

further wherein the carbon nanotube film comprises an electron emitter and exhibits an electron emitter density of at least $10^9/cm^2$.

14. A device according to claim 13:

further wherein the electron emitter exhibits a threshold emission field of less than 20 V/$\mu$m at a current density of 10 mA/cm$^2$.

15. A device according to claim 14:

wherein the threshold emission field remains at a value less than 20 V/$\mu$m after sustaining a current density of 10 mA/cm$^2$ for at least 50 hours.

16. A device according to claim 11:

wherein the carbon nanotube film further comprises amorphous carbon; and further wherein the proportion of amorphous carbon in the carbon nanotube film decreases as a distance from the substrate increases.

17. A device according to claim 11:

wherein the device comprises a microwave amplifier or a display.

* * * * *

UNITED STATES PATENT AND TRADEMARK OFFICE
CERTIFICATE OF CORRECTION

PATENT NO. : 6,630,772 B1  Page 1 of 1
APPLICATION NO. : 09/296572
DATED : October 7, 2003
INVENTOR(S) : Bower et al.

It is certified that error appears in the above-identified patent and that said Letters Patent is hereby corrected as shown below:

On title page, INSERT:

--GOVERNMENT ISSUES

This invention was made with Government support under Grant No. N00014-98-1-0597 awarded by the Office of Naval Research. The Government has certain rights in the invention.--

Signed and Sealed this

Eighteenth Day of July, 2006

JON W. DUDAS
*Director of the United States Patent and Trademark Office*